United States Patent
Xiao et al.

(10) Patent No.: US 10,514,807 B2
(45) Date of Patent: Dec. 24, 2019

(54) TELEVISION VIRTUAL TOUCH CONTROL METHOD AND SYSTEM

(71) Applicant: SHENZHEN ORBBEC CO., LTD., Shenzhen, Guangdong (CN)

(72) Inventors: Zhenzhong Xiao, Guangdong (CN); Honghuai Xu, Guangdong (CN); Long Liu, Guangdong (CN); Yuanhao Huang, Guangdong (CN)

(73) Assignee: Shenzhen Orbbec Co., Ltd., Shenzhen, Guangdong (CN)

( * ) Notice: Subject to any disclaimer, the term of this patent is extended or adjusted under 35 U.S.C. 154(b) by 296 days.

(21) Appl. No.: 15/321,935

(22) PCT Filed: May 21, 2015

(86) PCT No.: PCT/CN2015/079450
§ 371 (c)(1),
(2) Date: Dec. 23, 2016

(87) PCT Pub. No.: WO2015/196878
PCT Pub. Date: Dec. 30, 2015

(65) Prior Publication Data
US 2018/0210611 A1   Jul. 26, 2018

(30) Foreign Application Priority Data

Jun. 26, 2014 (CN) .......................... 2014 1 0298388

(51) Int. Cl.
*G06F 3/042* (2006.01)
*G06T 7/50* (2017.01)
(Continued)

(52) U.S. Cl.
CPC .............. *G06F 3/0425* (2013.01); *G06T 7/50* (2017.01); *G01B 11/25* (2013.01);
(Continued)

(58) Field of Classification Search
CPC ......... G06F 3/0425; G06F 2203/04101; G06T 7/50; G06T 7/194; G06T 2207/10028; H04N 13/00
(Continued)

(56) References Cited

U.S. PATENT DOCUMENTS

2002/0041327 A1* 4/2002 Hildreth .................. G06F 3/011
348/42

FOREIGN PATENT DOCUMENTS

| CN | 101561709 A | 10/2009 |
| CN | 102769802 A | 11/2012 |
| CN | 104065949 A | 9/2014 |

OTHER PUBLICATIONS

International Search Report and Written Opinion for Application No. PCT/CN2015/079450, dated Aug. 3, 2015, 8 pages.

\* cited by examiner

*Primary Examiner* — Amare Mengistu
*Assistant Examiner* — Gloryvid Figueroa-Gibson
(74) *Attorney, Agent, or Firm* — Sheppard Mullin Richter & Hampton LLP

(57) ABSTRACT

The present invention discloses a television virtual touch control method and system. The television virtual touch control method is used in a television having a depth camera and includes the following steps: acquiring a human body image having depth information by the depth camera in real time; presetting an area excluding a hand area in a human body area as a reference area; extracting the depth information of the reference area and the hand area from the human body image; defining a virtual touch surface between the depth camera and the reference area at a first predetermined distance D1 from the reference area; and determining whether the hand area touches or penetrates through the virtual touch surface according to the depth information of
(Continued)

the hand area, the depth information of the reference area and the first predetermined distance D1. The present invention has the beneficial effects of improving touch sensitivity and enhancing user experience.

15 Claims, 1 Drawing Sheet

(51) Int. Cl.
    *G06T 7/194*     (2017.01)
    *G01B 11/25*     (2006.01)

(52) U.S. Cl.
    CPC .... *G06F 2203/04101* (2013.01); *G06T 7/194* (2017.01); *G06T 2207/10028* (2013.01)

(58) Field of Classification Search
    USPC .......................................................... 345/175
    See application file for complete search history.

TELEVISION VIRTUAL TOUCH CONTROL METHOD AND SYSTEM

CROSS-REFERENCE TO RELATED APPLICATIONS

This application is a National Phase application of International Application No. PCT/CN2015/079450, filed on May 21, 2015, which is based on and claims priority to and benefits of Chinese Patent Application No. 201410298388.8, filed with State Intellectual Property Office on Jun. 26, 2014. The entire contents of the above-referenced applications are incorporated herein by reference.

TECHNICAL FIELD

The present invention relates to a virtual touch control method, and more specifically relates to a television virtual touch control method and system based on depth information.

BACKGROUND

In a virtual touch control method in the prior art, a camera is used for shooting images of fingers. Whether a virtual touch surface is touched is determined by comparing the size of the fingers. However, and the determination of the size of fingers may have greater errors and be insensitive. Moreover, the virtual touch surfaces in the prior art are defined by televisions or display screens thereof as reference surfaces, and when users walk, the virtual touch surfaces are static, thereby being inconvenient for users.

Therefore, the prior art methods have disadvantages and need to be improved.

SUMMARY

The technical problem to be solved in the present invention is to provide an improved television virtual touch control method and system in view of the aforementioned defects in the prior art.

One technical solution provided by the present invention to solve the technical problem includes: providing a television virtual touch control method, which can be used in a television having a depth camera and includes the following steps:

acquiring a human body image having depth information by the depth camera in real time;

presetting an area excluding a hand area in a human body area as a reference area;

extracting the depth information of the reference area and the hand area from the human body image;

defining a virtual touch surface between the depth camera and the reference area, the virtual touch surface being at a first predetermined distance D1 from the reference area; and determining whether the hand area touches or penetrates through the virtual touch surface according to the depth information of the hand area, the depth information of the reference area and the first predetermined distance D1;

wherein the extracting the depth information of the reference area and the hand area from the human body image includes:

separating the human body area from a background area in the human body image to acquire the depth information of the human body area; and calling a human body identification model to detect the hand area and the reference area in the human body area, and respectively extracting the depth information of the hand area and the reference area;

wherein the determining whether the hand area touches or penetrates through the virtual touch surface according to the depth information of the hand area, the depth information of the reference area and the first predetermined distance D1 includes:

calculating a first distance L1 from the hand area to the depth camera according to the depth information of the hand area;

calculating a second distance L2 from the reference area to the depth camera according to the depth information of the reference area; and determining that the hand area touches the virtual touch surface when $0 \leq L1-(L2-D1) \leq X1$, and determining that the hand area penetrates through the virtual touch surface when $-X2 \leq L1-(L2-D1)<0$, wherein X1 represents a preset first distance threshold, and X2 represents a preset second distance threshold.

In the television virtual touch control method provided by the present invention, when the hand area touches the virtual touch surface, the movement of the hand area controls one or more objects on a display screen of the television to move.

In the television virtual touch control method provided by the present invention, the process in which the hand area penetrates through the virtual touch surface and returns to the virtual touch surface is deemed as a click action.

In the television virtual touch control method provided by the present invention, the presetting an area excluding a hand area in a human body area as a reference area includes: presetting a plane in which two shoulders and a trunk of a human body are located as the reference area.

The television virtual touch control method provided by the present invention further includes the following step: establishing the human body identification model based on features of the reference area and features of the hand area.

Another technical solution provided by the present invention to solve the technical problem includes: providing a television virtual touch control method, which can be used in a television having a depth camera and includes the following steps:

acquiring a human body image having depth information by the depth camera in real time;

presetting an area excluding a hand area in a human body area as a reference area;

acquiring the depth information of the reference area and the hand area from the human body image;

defining a virtual touch surface between the depth camera and the reference area, the virtual touch surface being at a first predetermined distance D1 from the reference area; and determining whether the hand area touches or penetrates through the virtual touch surface according to the depth information of the hand area, the depth information of the reference area and the first predetermined distance D1.

In the television virtual touch control method provided by the present invention, the determining whether the hand area touches or penetrates through the virtual touch surface according to the depth information of the hand area, the depth information of the reference area and the first predetermined distance D1 includes:

calculating a first distance L1 from the hand area to the depth camera according to the depth information of the hand area;

calculating a second distance L2 from the reference area to the depth camera according to the depth information of the reference area; and determining that the hand area touches the virtual touch surface when $0 \leq L1-(L2-D1) \leq X1$, and distance that the hand area penetrates through the virtual touch surface when $-X2 \leq L1-(L2-D1) < 0$, wherein X1 represents a preset first distance threshold, and X2 represents a preset second distance threshold.

In the television virtual touch control method provided by the present invention, when the hand area touches the virtual touch surface, the movement of the hand area controls one or more objects on a display screen of the television to move.

In the television virtual touch control method provided by the present invention, the process in which the hand area penetrates through the virtual touch surface and returns to the virtual touch surface is deemed as a click action.

In the television virtual touch control method provided by the present invention, the presetting an area excluding a hand area in a human body area as a reference area includes:

presetting a plane in which two shoulders and a trunk of a human body are located as the reference area.

In the television virtual touch control method provided by the present invention, the acquiring the depth information of the reference area and the hand area from the human body image includes:

separating the human body area from a background area in the human body image to acquire the depth information of the human body area; and calling a human body identification model to detect the hand area and the reference area in the human body area, and respectively extracting the depth information of the hand area and the reference area.

The television virtual touch control method provided by the present invention further includes the following step: establishing the human body identification model based on features of the reference area and features of the hand area.

The present invention further provides a television virtual touch system, including:

a depth camera for acquiring a human body image having depth information in real time;

a depth information extraction module for presetting an area excluding a hand area in a human body area as a reference area and extracting the depth information of the reference area and the hand area from the human body image;

a virtual touch module for defining a virtual touch surface between the depth camera and the reference area, the virtual touch surface being at a first predetermined distance D1 from the reference area; and an operation processing module for determining whether the hand area touches or penetrates through the virtual touch surface according to the depth information of the hand area, the depth information of the reference area and the first predetermined distance D1.

In the television virtual touch system provided by the present invention, the operation processing module is used for calculating a first distance L1 from the hand area to the depth camera according to the depth information of the hand area, and calculating a second distance L2 from the reference area to the depth camera according to the depth information of the reference area; the operation processing module determines that the hand area touches the virtual touch surface when $0 \leq L1-(L2-D1) \leq X1$, and the operation processing module determines that the hand area penetrates through the virtual touch surface when $-X2 \leq L1-(L2-D1) < 0$, wherein X1 represents a preset first distance threshold, and X2 represents a preset second distance threshold; and the depth information extraction module presets a plane in which two shoulders and a trunk of a human body are located as the reference area.

In the television virtual touch system provided by the present invention, the depth information extraction module is used for separating the human body area from a background area in the human body image to acquire the depth information of the human body area, calling a human body identification model to detect the hand area and the reference area in the human body area, and respectively extracting the depth information of the hand area and the reference area.

The television virtual touch control method and system provided by the present invention are implemented to achieve the following beneficial effects:

whether the hand area touches or penetrates through the virtual touch surface is determined according to the depth information of the hand area, the depth information of the reference area and the first predetermined distance D1, so that the present invention has the beneficial effects of higher sensitivity; and since the virtual touch surface uses the reference area as a reference standard, and the reference area is an area excluding the hand area in the human body area, the virtual touch surface can move while the user is walking, and thus the present invention has the beneficial effects of facilitating the use of the user and improving user experience.

BRIEF DESCRIPTION OF THE DRAWINGS

The present invention will be further illustrated below in combination with the accompanying drawings and embodiments, in which.

DETAILED DESCRIPTION OF SOME EMBODIMENTS

In order to understand the technical features, purposes and effects of the present invention more clearly, specific implementations of the present invention will be illustrated in detail with reference to the accompanying drawings.

Figure 1:
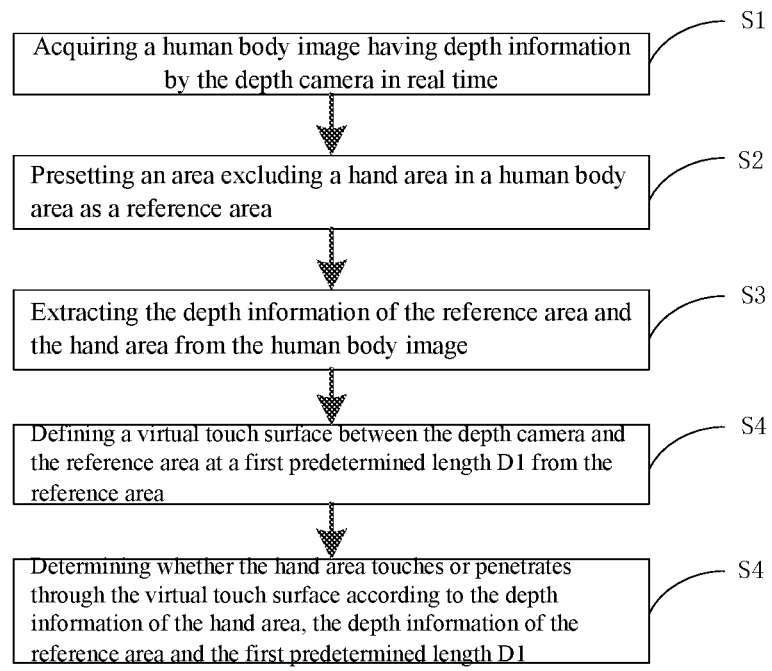
FIG. 1 is a flow block diagram of a television virtual touch control method according to a preferred embodiment of the present invention.

As shown in FIG. 1, one preferred embodiment of the present invention provides a television virtual touch control method, which can be used in a television having a depth camera. The television can be a computer, a smart television and the like, and the method includes the following steps:

S1, acquiring a human body image having depth information by the depth camera in real time;

S2, presetting an area excluding a hand area in a human body area as a reference area;

S3, acquiring the depth information of the reference area and the hand area from the human body image;

S4, defining a virtual touch surface between the depth camera and the reference area, the virtual touch surface being at a first predetermined distance D1 from the reference area; and S5, determining whether the hand area touches or penetrates through the virtual touch surface according to the depth information of the hand area, the depth information of the reference area and the first predetermined distance D1.

In step S4, since the reference area is referential to the virtual touch surface, during movement, the virtual touch surface moves together for facilitating the operation, thereby having the beneficial effects of improving the user experience.

The method for acquiring the human body image having the depth information by the depth camera in real time in step S1 includes, but is not limited to, the following method: (1) acquiring depth information based on structured light, for example, the depth camera employing a light coding structured light method, a depth camera Primesense employing a laser speckle method, a depth camera Kinect of Microsoft; acquiring a depth image by projection grating and fringe scanning methods; (2) acquiring depth information based on laser ranging; and (3) acquiring depth information based on vision technology, etc.

In step S2, a plane including a trunk and two shoulders of a human body is preset as the reference area, and the reference area is used as reference for defining the virtual touch surface. Of course, it can be understood that other areas excluding the hand of the human body can also be used as the reference area, and this is not limited herein.

Preferably, the step S3, acquiring the depth information of the reference area and the hand area from the human body image includes:

S301, separating the human body area from a background area in the human body image to acquire the depth information of the human body area; and S302, calling a human body identification model to detect the hand area and the reference area in the human body area, and respectively extracting the depth information of the hand area and the reference area.

In step S301, the depth information of the human body image constitutes the depth image. When the human body area is separated from the background environment based on the depth information, Laplace-Gaussian operator and other methods can be used to filter and reduce noise on the depth image, and a noise threshold can be applied to the processing. During noise processing, when relatively obvious noise points occur in the depth image, suitable structural elements can be defined by the <cvErode> function in OpenCV to corrode the source image, and after redundant noise points are removed, the <cvDilate> function is used for expanding the obtained result image so as to remove most of the noise points. After the noise is removed, the entire depth image can be called, edge detection, dynamic depth threshold setting employing the <autothreshold> function of the OpenCV, human body target feature point classification and other methods are used to divide the human body area from the entire depth image, so as to detect the human body and extract the depth information of the human body area. In the embodiment, the depth image of the human body area is extracted at first, and only the data of the human body area can be transmitted in the subsequent processing flow, thereby reducing the operational load and improving the processing speed.

Thereafter, in step S302, the data of the human body area extracted in step S301 is used for identifying the hand area and the reference area and extracting the depth information of the hand area and the reference area according to the depth information and the human body identification model.

The human body identification model in step S302 is a human body identification model which is established based on the feature of the reference area and the feature of the hand area. A classifier method can be used for training the human body identification model based on the feature of the reference area and the feature of the hand area, so as to detect the hand area and the reference area and extract the depth information of the hand area and the reference area.

In step S4, the virtual touch surface is in a shape adapted to the display screen of the television, the first predetermined distance D1 can be 30 cm or 40 cm, and of course it is not limited thereto.

Step S5 includes the following sub-steps:

S501, calculating a first distance L1 from the hand area to the depth camera according to the depth information of the hand area;

S502, calculating a second distance L2 from the reference area to the depth camera according to the depth information of the reference area; and determining that the hand area touches the virtual touch surface when $0 \leq L1-(L2-D1) \leq X1$, and determining that the hand area penetrates through the virtual touch surface when $-X2 \leq L1-(L2-D1) < 0$, wherein X1 represents a preset first distance threshold, and X2 represents a preset second distance threshold.

Calculation of a distance from the corresponding area to the depth camera is calculated according to the depth information of an object of a shot area is in the prior art, and thus will not be repeated herein.

Further, when the hand area touches the virtual touch surface, the movement of the hand area controls one or more objects on a display screen of the television to move. The process in which the hand area penetrates through the virtual touch surface and returns to the virtual touch surface is deemed as a click action.

Figure 2:
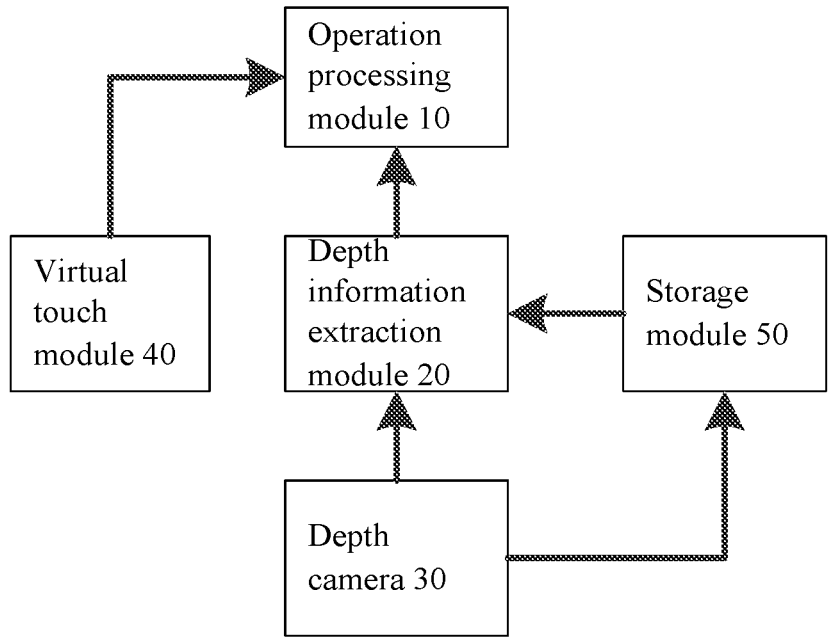
FIG. 2 is a functional block diagram of a television virtual touch system according to a preferred embodiment of the present invention.

As shown in FIG. 2, the present invention further provides a television virtual touch system, including:

a depth camera 30 for acquiring a human body image having depth information in real time;

a depth information extraction module 20 for presetting an area excluding a hand area in a human body area as a reference area and extracting the depth information of the reference area and the hand area from the human body image;

a virtual touch module 40 for defining a virtual touch surface between the depth camera 30 and the reference area, the virtual touch surface being at a first predetermined distance D1 from the reference area;

an operation processing module 10 for determining whether the hand area touches or penetrates through the virtual touch surface according to the depth information of the hand area, the depth information of the reference area and the first predetermined distance D1; and a storage module 50, wherein the storage module 50 is used for storing a pre-established human body identification model and the human body image collected by the depth camera 30.

The virtual touch module 40 is connected with the operation processing module 10, the depth camera 30, the depth information extraction module 20 and the operation processing module 10 are connected in sequence, and the storage module 50 is respectively connected with the depth information extraction module 20 and the depth camera 30.

Specifically, the operation processing procedure of the operation processing module 10 is as follows: calculating a first distance L1 from the hand area to the depth camera according to the depth information of the hand area, and calculating a second distance L2 from the reference area to the depth camera according to the depth information of the reference area; and the operation processing module 10 determines that the hand area touches the virtual touch surface when $0 \leq L1-(L2-D1) \leq X1$, and the operation processing module 10 determines that the hand area penetrates through the virtual touch surface when −X2≤L1−(L2−D1)<0, wherein X1 represents a preset first distance threshold, and X2 represents a preset second distance threshold.

Further, when the operation processing module 10 determines that the hand area touches the virtual touch surface, it triggers the movement of the hand area to control one or more objects on a display screen of a television to move. The process, in which the operation processing module 10 determines that the hand area penetrates through the virtual touch surface and returns to the virtual touch surface, is deemed as a click action.

Moreover, the depth information extraction module 20 presets a plane in which two shoulders and a trunk of a human body are located as the reference area.

The depth information extraction module 20 is further used for separating the human body area from a background area in the human body image to acquire the depth information of the human body area, calling a human body identification model to detect the hand area and the reference area in the human body area, and respectively extracting the depth information of the hand area and the reference area. The depth image of the human body area is extracted at first, and only the data of the human body area can be transmitted in the subsequent processing flow, thereby reducing the operational load and improving the processing speed. The human body identification model is established by using a classifier method based on the feature of the hand area and the feature of the reference area.

Whether the hand area touches or penetrates through the virtual touch surface is determined according to the depth information of the hand area, the depth information of the reference area and the first predetermined distance D1, so that the present invention has the beneficial effects of higher sensitivity; and since the virtual touch surface uses the reference area as a reference standard, and the reference area is an area excluding the hand area in the human body area, the virtual touch surface can move with the walk of the user, and thus the present invention has the beneficial effects of facilitating the use of the user and improving user experience.

Although the embodiments of the present invention have been described above in combination with the accompanying drawings, the present invention is not limited to the aforementioned specific implementations, the aforementioned specific implementations are merely schematic, rather than restrictive, those of ordinary skill in the art can make a variety of forms under the enlightenment of the present invention without departing from the principle of the present invention and the protection scope of the claims, and these forms all fall within the protection scope of the present invention.

What is claimed is:

1. A television virtual touch control method for a television having a depth camera, comprising the following steps:
   acquiring a human body image having depth information by the depth camera in real time;
   presetting an area excluding a hand area in a human body area as a reference area, wherein the reference area is in the human body area;
   extracting the depth information of the reference area and the hand area from the human body image;
   defining a virtual touch surface between the depth camera and the reference area, the virtual touch surface being at a first predetermined distance D1 from the reference area; and
   determining whether the hand area touches or penetrates through the virtual touch surface according to the depth information of the hand area, the depth information of the reference area and the first predetermined distance D1;
   wherein, the extracting the depth information of the reference area and the hand area from the human body image comprises:
   separating the human body area from a background area in the human body image to acquire the depth information of the human body area; and
   calling a human body identification model to detect the hand area and the reference area in the human body area, and respectively extracting the depth information of the hand area and the reference area;
   wherein, the determining whether the hand area touches or penetrates through the virtual touch surface according to the depth information of the hand area, the depth information of the reference area and the first predetermined distance D1 comprises:
   calculating a first distance L1 from the hand area to the depth camera according to the depth information of the hand area;
   calculating a second distance L2 from the reference area to the depth camera according to the depth information of the reference area; and
   determining that the hand area touches the virtual touch surface when 0≤L1−(L2−D1)≤X1, and determining that the hand area penetrates through the virtual touch surface when −X2≤L1−(L2−D1)<0, wherein X1 represents a preset first distance threshold, and X2 represents a preset second distance threshold.

2. The television virtual touch control method of claim 1, wherein when the hand area touches the virtual touch surface, the movement of the hand area controls one or more objects on a display screen of the television to move.

3. The television virtual touch control method of claim 2, wherein the process in which the hand area penetrates through the virtual touch surface and returns to the virtual touch surface is deemed as a click action.

4. The television virtual touch control method of claim 1, wherein the presetting an area excluding a hand area in a human body area as a reference area comprises:
   presetting a plane in which two shoulders and a trunk of a human body are located as the reference area.

5. The television virtual touch control method of claim 1, further comprising the following step: establishing the human body identification model based on features of the reference area and features of the hand area.

6. A television virtual touch control method for a television having a depth camera, comprising the following steps:
   acquiring a human body image having depth information by the depth camera in real time;
   presetting an area excluding a hand area in a human body area as a reference area, wherein the reference area is in the human body area;
   acquiring the depth information of the reference area and the hand area from the human body image;
   defining a virtual touch surface between the depth camera and the reference area, the virtual touch surface being at a first predetermined distance D1 from the reference area; and
   determining whether the hand area touches or penetrates through the virtual touch surface according to the depth information of the hand area, the depth information of the reference area and the first predetermined distance D1.

7. The television virtual touch control method of claim 6, wherein the determining whether the hand area touches or penetrates through the virtual touch surface according to the depth information of the hand area, the depth information of the reference area and the first predetermined distance D1 comprises:
- calculating a first distance L1 from the hand area to the depth camera according to the depth information of the hand area;
- calculating a second distance L2 from the reference area to the depth camera according to the depth information of the reference area; and
- determining that the hand area touches the virtual touch surface when $0 \leq L1-(L2-D1) \leq X1$, and determining that the hand area penetrates through the virtual touch surface when $-X2 \leq L1-(L2-D1)<0$, wherein X1 represents a preset first distance threshold, and X2 represents a preset second distance threshold.

8. The television virtual touch control method of claim 7, wherein when the hand area touches the virtual touch surface, the movement of the hand area controls one or more objects on a display screen of the television to move.

9. The television virtual touch control method of claim 8, wherein the process in which the hand area penetrates through the virtual touch surface and returns to the virtual touch surface is deemed as a click action.

10. The television virtual touch control method of claim 6, wherein the presetting an area excluding a hand area in a human body area as a reference area comprises:
- presetting a plane in which two shoulders and a trunk of a human body are located as the reference area.

11. The television virtual touch control method of claim 6, wherein the acquiring the depth information of the reference area and the hand area from the human body image comprises:
- separating the human body area from a background area in the human body image to acquire the depth information of the human body area; and
- calling a human body identification model to detect the hand area and the reference area in the human body area, and respectively extracting the depth information of the hand area and the reference area.

12. The television virtual touch control method of claim 11, further comprising the following step: establishing the human body identification model based on features of the reference area and features of the hand area.

13. A television virtual touch system, comprising:
- a depth camera for acquiring a human body image having depth information in real time; and
- a computer configured to perform operations comprising:
  - presetting an area excluding a hand area in a human body area as a reference area and extracting the depth information of the reference area and the hand area from the human body image, wherein the reference area is in the human body area;
  - defining a virtual touch surface between the depth camera and the reference area, the virtual touch surface being at a first predetermined distance D1 from the reference area; and
  - determining whether the hand area touches or penetrates through the virtual touch surface according to the depth information of the hand area, the depth information of the reference area and the first predetermined distance D1.

14. The television virtual touch system of claim 13, wherein the operations further comprise:
- calculating a first distance L1 from the hand area to the depth camera according to the depth information of the hand area;
- calculating a second distance L2 from the reference area to the depth camera according to the depth information of the reference area;
- determining that the hand area touches the virtual touch surface when $0 \leq L1-(L2-D1) \leq X1$, and determining that the hand area penetrates through the virtual touch surface when $-X2 \leq L1-(L2-D1)<0$, wherein X1 represents a preset first distance threshold, and X2 represents a preset second distance threshold; and
- presetting a plane in which two shoulders and a trunk of a human body are located as the reference area.

15. The television virtual touch system of claim 14, wherein the operations further comprise: separating the human body area from a background area in the human body image to acquire the depth information of the human body area, calling a human body identification model to detect the hand area and the reference area in the human body area, and respectively extracting the depth information of the hand area and the reference area.

* * * * *